(12) United States Patent
Shaw

(10) Patent No.: US 8,210,560 B2
(45) Date of Patent: Jul. 3, 2012

(54) DRAWBAR BORE ADAPTER

(75) Inventor: Matthew Shaw, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 328 days.

(21) Appl. No.: 12/552,751

(22) Filed: Sep. 2, 2009

(65) Prior Publication Data
US 2011/0049840 A1    Mar. 3, 2011

(51) Int. Cl.
B60D 1/02    (2006.01)
(52) U.S. Cl. .................. 280/515; 280/504; 280/506
(58) Field of Classification Search .............. 280/515, 280/504, 506
See application file for complete search history.

(56) References Cited

U.S. PATENT DOCUMENTS

| | | | | |
|---|---|---|---|---|
| 3,552,775 A | * | 1/1971 | Warner | 280/492 |
| 3,843,160 A | * | 10/1974 | Frushour et al. | 280/416.1 |
| 5,201,827 A | | 4/1993 | Glover et al. | |
| 5,277,447 A | * | 1/1994 | Blaser | 280/479.2 |
| 5,769,559 A | * | 6/1998 | Olson | 403/322.1 |
| 6,758,486 B1 | | 7/2004 | Kollath et al. | |
| 6,834,879 B1 | * | 12/2004 | Lorman | 280/506 |
| 7,316,534 B2 | * | 1/2008 | Hohmann et al. | 411/340 |
| 7,516,975 B2 | | 4/2009 | Lair et al. | |
| 7,600,774 B1 | * | 10/2009 | Speer et al. | 280/506 |
| 7,717,455 B2 | * | 5/2010 | Morris | 280/506 |
| 2004/0239073 A1 | | 12/2004 | Goettker | |
| 2004/0265049 A1 | * | 12/2004 | Hohmann et al. | 403/153 |
| 2010/0007117 A1 | * | 1/2010 | Morris | 280/515 |

FOREIGN PATENT DOCUMENTS

| | | |
|---|---|---|
| DE | 19710583 A1 | 9/1998 |
| DE | 19840001 A1 | 3/2000 |
| DE | 102004047404 A1 | 3/2006 |
| EP | 0752328 A1 | 1/1997 |

OTHER PUBLICATIONS

Search Report for PCT International Application No. PCT/IB2010/002053 dated Jan. 21, 2011.

* cited by examiner

*Primary Examiner* — Anne Marie Boehler
*Assistant Examiner* — Michael Stabley

(57) ABSTRACT

In an example embodiment a drawbar pin bore adapter includes a bushing sized to fit within a drawbar pin bore of a first size and a retainer to secure the bushing to the drawbar. The bushing may include a primary portion having an outer diameter configured for insertion into the drawbar pin bore, an inner diameter configured to receive a drawbar pin of a second diameter; and an extension portion configured to protrude from the drawbar bore and engage the retainer to secure at least a portion of the bushing within the drawbar pin bore.

10 Claims, 3 Drawing Sheets

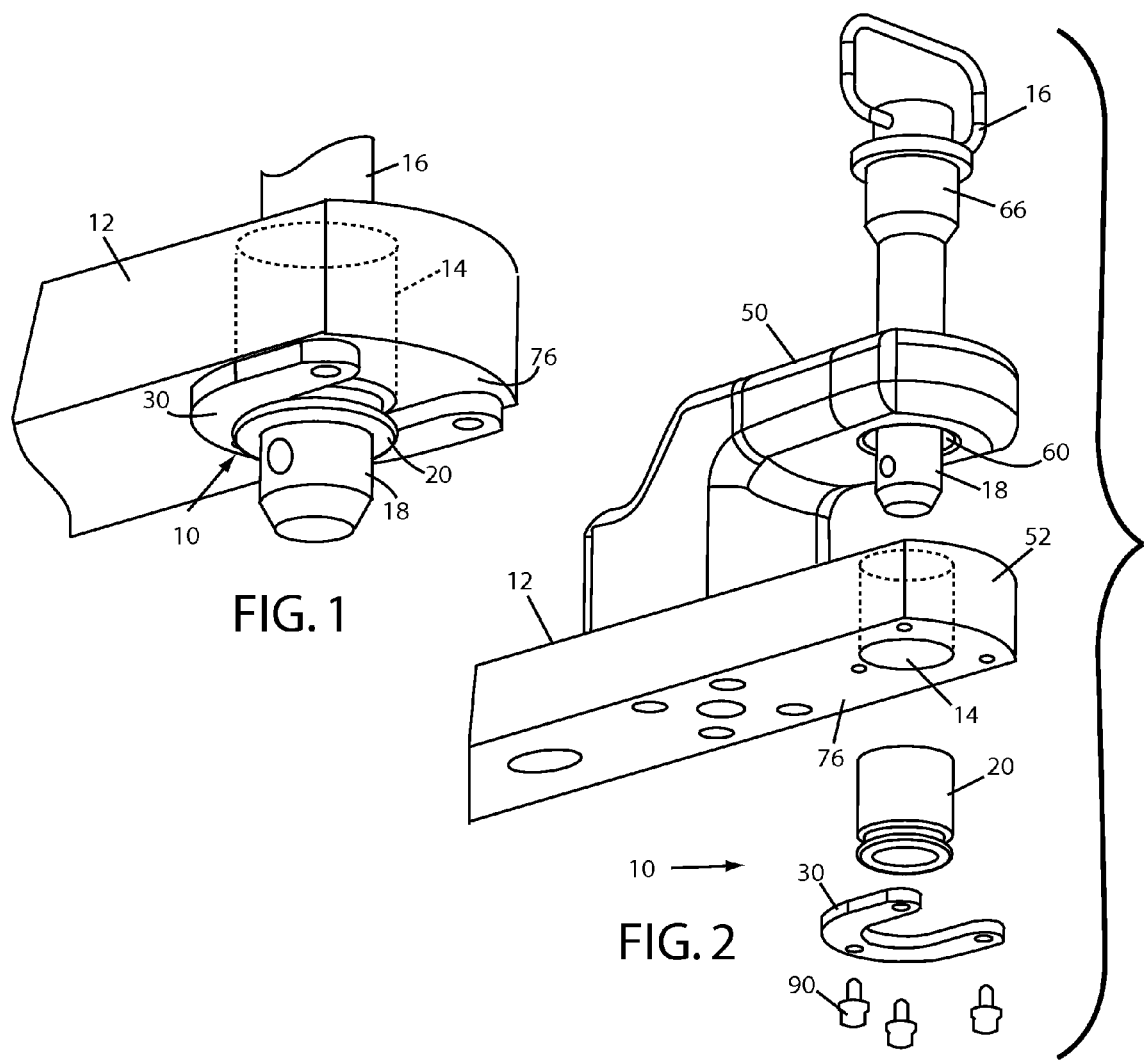

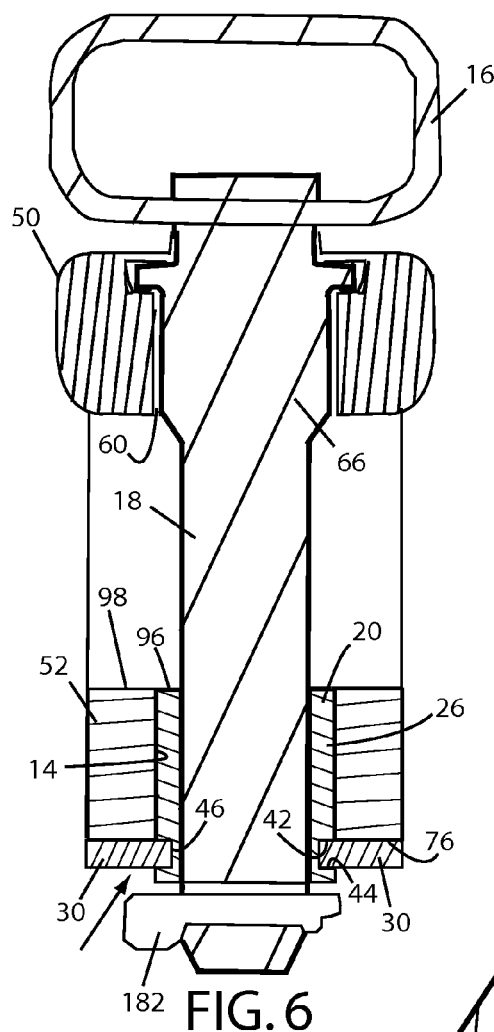
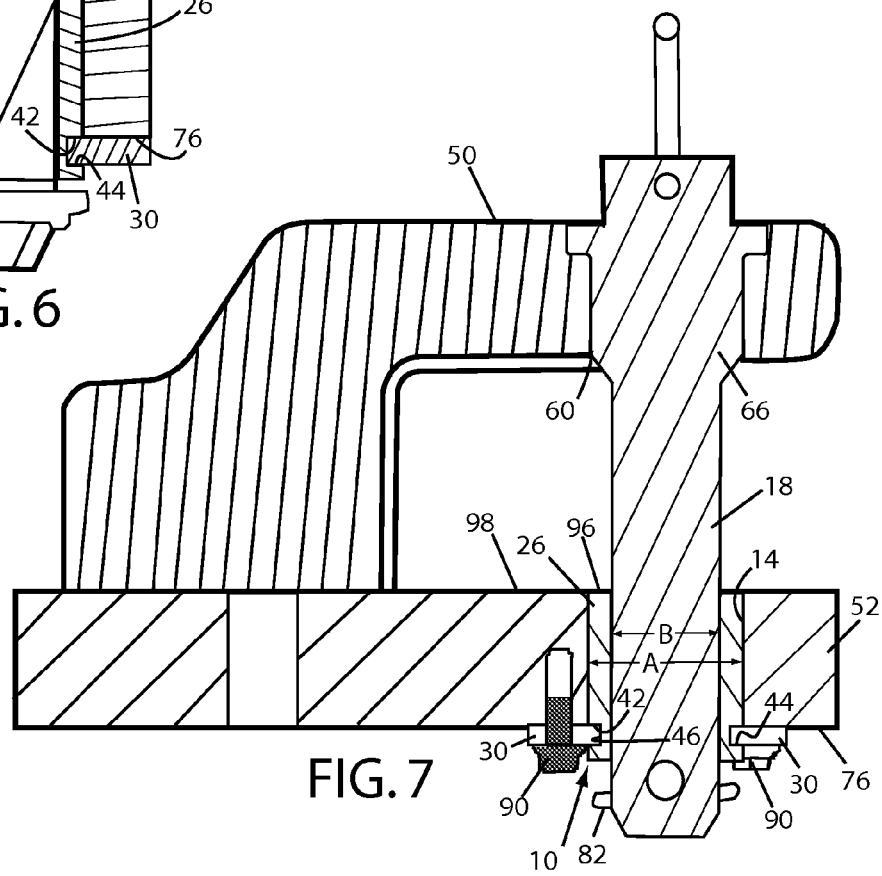

DRAWBAR BORE ADAPTER

TECHNICAL FIELD

The present disclosure relates generally to drawbars, and more particularly, to adapters for drawbar pin bores.

BACKGROUND

Drawbars are commonly used to couple implements to a vehicle, such as a tractor. As tractor sizes have increased, so have the sizes of the drawbar pins and drawbar pin bores used for receiving such pins. For example, a larger category 5 drawbar pin has been developed for use with larger category 5 drawbar pin bores. A need may arise, however, to hitch these larger tractors to smaller implements that use smaller drawbar pins sized for smaller drawbar pin bores. Generally, however, drawbar pins of one size or category are not readily compatible with a drawbar pin bores of a different size or category. For example, inserting a smaller category 4 drawbar pin into a larger category 5 drawbar pin bore leads to excessive wear on both the drawbar pin and the drawbar pin bore.

BRIEF DESCRIPTION OF THE DRAWINGS

FIG. 1 shows a perspective view of an example embodiment of a drawbar bore adapter installed in a drawbar.

FIG. 2 shows an exploded view of an example embodiment of a drawbar arrangement including a drawbar bore adapter.

FIG. 6 shows a front cutaway view of a drawbar bore adapter installed in a drawbar.

FIG. 7 shows a side cutaway view of a drawbar bore adapter installed in a drawbar.

OVERVIEW

Figure 3:
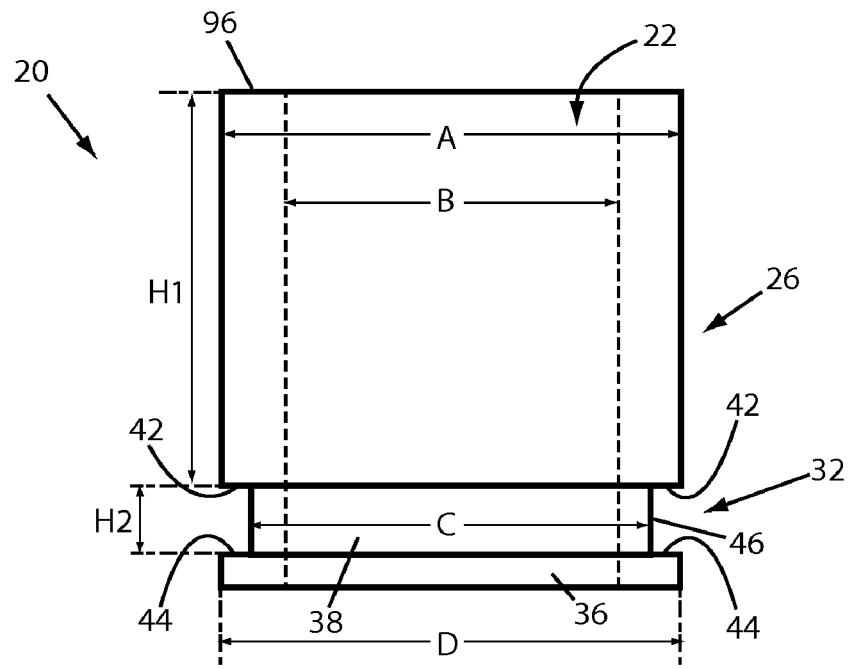
FIG. 3 shows a side view of an example embodiment of a bushing that may be used in a drawbar bore adapter.

An adapter is configured to convert a drawbar pin bore from a first size to a second size, such as from an original larger size to a smaller size. In an example embodiment, a drawbar pin bore adapter comprises a bushing configured for insertion into a drawbar pin bore and a retainer configured to floatingly secure the bushing within the drawbar pin bore. The bushing is sized for placement within the original larger drawbar pin bore, such as a category 5 drawbar pin bore, to provide a pin bore sized for use with a smaller sized drawbar pin, such as a category 4 drawbar pin.

In an example embodiment, the bushing may be cylindrical with a primary outer diameter that is slightly smaller than the diameter of the drawbar pin bore in which it is to be installed, (such as a category 5 drawbar pin bore), to provide a nominal clearance between the bushing and the drawbar pin bore to allow insertion of the bushing within the drawbar pin bore and the rotation of the bushing within the drawbar pin bore. The bushing may have an inner diameter that serves a smaller drawbar pin bore that is sized to generally match the standard clearance provided by a standard drawbar pin bore designed for use with the associated smaller drawbar pin. For example, the bushing may have an inner diameter that provides a pin bore equivalent to a standard category 4 drawbar pin bore.

The bushing may have a second outer diameter, also referred to herein as an attachment diameter, which is configured for engagement with a retainer to floatingly secure the bushing to the drawbar. In an example embodiment, the attachment diameter is less than the primary diameter so as to form a notch in the bushing and provide retaining surfaces for contacting the retainer. The bushing may be sized such that when the bushing is installed in the drawbar bore the notch is positioned just below the lower surface of the drawbar to allow the retainer plate to engage the notch and attach to the bottom surface of the drawbar to retain the bushing within the drawbar pin bore. For example, the retainer plate may be inserted into the notch and secured to the bottom surface of the drawbar by bolts or other fasteners to secure the bushing within the drawbar pin bore in a manner that prevents the bushing from falling out of the drawbar pin bore while still allowing the bushing to at least partially and preferably freely rotate within the drawbar pin bore.

In an example embodiment, the retainer is a generally open-ended planar U-shaped plate that may be fastened to the under surface of the drawbar and engage the notch of the bushing. The retainer plate may be oriented so that the open end of the retainer faces rearward so that as the drawbar pin bore wears and is deformed through normal use, the bushing shifts back and maintains engagement with the retainer plate.

In an example method of the invention, the bushing is placed in the drawbar bore with the notch just below the bottom surface of the drawbar, the retainer plate is slid into the notch in the bushing, and the retainer plate is bolted upward to the bottom surface of the drawbar to secure the bushing within the drawbar bore.

Description of Example Embodiments

As required, exemplary embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which exemplary embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention. For example, while the exemplary embodiments are discussed in the context of an adapter that converts a category 5 drawbar pin bore to a category 4 drawbar pin bore, it will be understood that the present invention is not limited to adapting those specific drawbar pin bore sizes and that the adapter could be used to convert between drawbar pin bores of other sizes.

Turning to the figures wherein like numbers represent like elements throughout the several views, FIG. 1 shows a drawbar bore adapter 10 installed in a tractor drawbar 12. The adapter 10 converts a drawbar pin bore 14 from a larger size for use with a drawbar pin of a larger diameter to a bore of an appropriate smaller size for a drawbar pin 16 having a smaller diameter shank 18. In this example embodiment, the adapter 10 converts a category 5 drawbar pin bore 14 to a category 4 drawbar pin bore for use with the category 4 drawbar pin 16. The adapter 10 may include a bushing 20 and a retainer 30 configured to secure the bushing 20 to the drawbar 12.

FIG. 2 shows an exploded view of an example embodiment in which a drawbar 12 includes an upper hammer strap 50 and a lower strap 52 having pin bores 60 and 14, respectively, adapted to receive a category 5 drawbar pin. A category 4 drawbar pin 16 having a category 4 shank 18 is shown inserted through the upper hammer strap 50. In this example embodiment, the drawbar pin 16 has an upper category 5 shank 66 to secure within the bore 60 of the upper hammer strap 50. The adapter 10 may be installed in the lower strap 52 to convert the drawbar pin bore 14 to an appropriately sized category 4 bore to receive the smaller shank 18 of the drawbar pin 16.

As seen in FIG. 2, the adapter 10 may include a hollow cylindrical bushing 20 (shown in detail in FIG. 3) having a primary portion 26 having an outer diameter A that is sized to provide a nominal clearance with the drawbar pin bore 14. For example, for a category 5 drawbar pin bore 14 having a primary (inner) diameter of about 72.5 mm the bushing 20 may have an outer diameter A of about 70mm. This allows the bushing 20 to be installed and snugly fit within the drawbar pin bore 14 while still allowing the bushing 20 to rotate within the bore 14.

As also seen in FIG. 3, the bushing 20 may have an internal diameter B that defines a bushing bore 22 that provides a standard clearance for the smaller drawbar pin shank 18. For example, for a category 4 drawbar pin which has a diameter of about 50 mm, the inner diameter B of the bushing 20 may be about 52.5 mm. The bushing 20 may also have an extension 32 that includes an attachment portion 34 having an outer diameter C and an end portion 36 having an outer diameter D to define a notch 38 between the primary portion 26 and the end portion 36 that is configured to receive the retainer 30 to secure the primary portion 26 of the bushing 20 within the drawbar pin bore 14. In the example embodiment shown in FIG. 3, the outer diameter C is about 62 mm which is smaller than the primary outer diameter A. The outer diameter D of the end portion 36 may be of a size greater than diameter C of the attachment portion 34, and in an example embodiment shown in FIG. 3 is generally equal to the primary outer diameter A. The notch 38 provides upper 42 and lower shoulders 44 and an outer circumferential surface 46 that serve as contact surfaces for abutment with the retainer plate 30. The notch 38 may have a height H2 that is slightly greater than the thickness H3 of the retainer plate 30 (FIG. 4) so that the retainer plate 30 can be inserted into the notch 38 to contact the upper 42 and lower 44 shoulders and the outer circumferential surface 46 of the bushing 20.

The bushing 20 may have a height H1 that is slightly less than the drawbar thickness so that when the bushing 20 is installed in the drawbar pin bore 14 the upper end 96 of the bushing 20 is just below the top surface 98 of the drawbar 12 and the notch 38 is positioned just below the bottom surface 76 of the drawbar 12 so as to receive the retainer plate 30. This allows the top drawbar surface to have sufficient contact area with the top surface 98 of the, drawbar 12 to support the weight of the implement without imparting excessive forces to the bushing 20.

Figure 4:
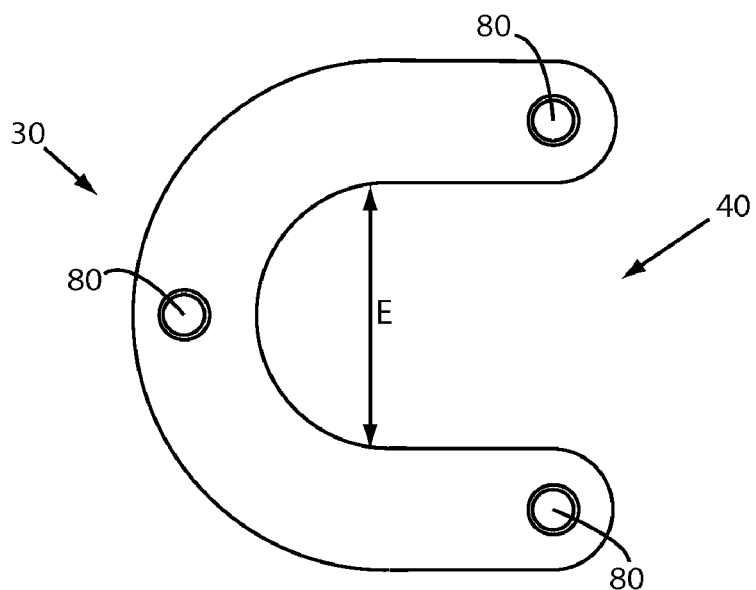
FIG. 4 shows a top view of an example embodiment of a retainer of a drawbar bore adapter.
Figure 5:
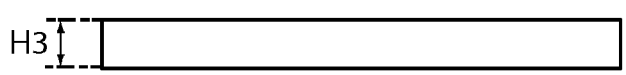
FIG. 5 shows a side view of the retainer of FIG. 4.

As shown in FIGS. 4 and 5, the retainer plate 30 may take the form of a U-shaped plate 30 having an open end 40 and a thickness H3 to allow insertion into the notch 38 of the bushing. The retainer plate 30 may have an inside diameter E that is slightly larger than the notch diameter C of the bushing 20 but smaller than the primary outer diameter A and outer diameter D of the bushing end portion 36. In the example embodiment shown in FIGS. 1 and 2, the open end of the retainer plate 30 may be positioned to face rearward so that as the drawbar pin bore 14 wears, the bushing 20 shifts back and maintains engagement with the retainer plate 30.

The retainer plate 30 may be provided with fastener holes 80, to allow the retainer plate 30 to be coupled to a bottom surface 76 (FIG. 2) of the drawbar 12. In the example embodiment, three openings 80 are provided and bolts 90 may be used to secure the retainer plate 30 to the drawbar 12. The fastener holes 80 may be offset from the pin center to allow for easy use of a drawbar lynchpin 82.

To install the adapter 10, the bushing 20 is placed in the drawbar bore 14 so that the notch 38 is positioned just below the bottom surface 76 of the drawbar 12. The retainer plate 30 may then be slid into the notch 38 and the retainer plate 30 bolted up to the bottom surface 76 of the drawbar 12. This floatingly secures the bushing 20 within the drawbar pin bore 14 to allow the bushing 20 to rotate within the bore 14 and move as the bore 14 wears. This arrangement also allows for the misalignment of the drawbar bore 14 and the retainer 30, while preventing the bushing 20 from shifting up or down within the drawbar bore 14 and potentially falling out. In addition, by allowing the retainer plate 30 to be bolted in place to the drawbar 12, the retainer plate 30 will not be affected by forces transmitted through the drawbar bore bushing 20.

The bushing 20 may be easily manufactured from low cost steel or similar material. The retainer 30 may be cut from plate steel or cast to include features that protect the bolt heads from wear.

FIGS. 6 and 7 show side and front cut-away views, respectively, in which a drawbar pin 16 is installed into a drawbar 12 so that shaft 18 of the drawbar pin 16 extends through the bushing 20. The retainer plate 30 is generally planar so as to be easily secured flush against the bottom surface 76 of the drawbar 12. The category 4 drawbar pin shaft 18 is inserted into and fits snuggly within the bushing 20, with the bushing 20 filling in the space between the drawbar pin shaft 18 and the category 5 drawbar pin bore 14. A lynchpin 82 or other fastener may be inserted through the drawbar pin 16 to secure the drawbar pin 16 to the drawbar 12. The retainer plate 30 is positioned within the notch 38 so that it engages the under surface 76 of the drawbar 12 and the upper shoulder 42, lower shoulder 44, and circumferential surface 46 of the bushing 20. Thus, the category 5 drawbar pin bore 14 is adapted to a category 4 drawbar pin bore.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. An adapter for a drawbar, the drawbar having an upper surface and a lower surface and a drawbar pin bore extending between said upper and lower surfaces, the adapter comprising:

a bushing sized to fit within said drawbar pin bore, the drawbar pin bore sized to receive a drawbar pin of a first diameter; and a retainer attached to the lower surface of the drawbar configured to secure the bushing within the drawbar pin bore, wherein the bushing comprises: a primary portion having an outer diameter configured for insertion into the drawbar pin bore and having an inner diameter configured to receive a drawbar pin of a second diameter; and an extension portion configured to protrude from the drawbar pin bore and engage the retainer to secure the primary portion within the drawbar pin bore, wherein an upper end of the bushing is below the top surface of the drawbar such that the bushing does not extend past said top surface when the retainer secures the bushing in drawbar pin bore.

2. The adapter of claim 1, wherein the bushing is configured to be floatingly secured within the drawbar pin bore by the retainer.

3. The adapter of claim 1, wherein the bushing is configured to be rotatably secured within the drawbar pin by the retainer.

4. The adapter of claim 1, wherein the extension portion defines a notch configured to engage the retainer.

5. The adapter of claim 3, wherein the bushing is configured to position the notch adjacent said lower surface of the drawbar.

6. The adapter of claim 1, wherein the extension portion includes a notch and an end portion, the notch having an outer diameter less than outer diameter of the primary portion and the end portion having an outer diameter greater than the notch.

7. The adapter of claim 1, wherein the retainer comprises a retainer plate that at least partially surrounds a circumferential surface of the bushing while allowing the bushing to at least partly rotate.

8. The adapter of claim 1, wherein the retainer comprises a U-shaped retainer plate.

9. The adapter of claim 1, wherein the extension portion defines a notch configured to engage the retainer and the retainer comprises a U-shaped retainer plate having an inside diameter larger than the diameter of the notch.

10. The adapter of claim 1 further comprising a plurality of fasteners, wherein the retainer comprises a U-shaped retainer plate having a plurality of fastener openings, the fastener openings offset from the center, and said fasteners attach the retainer to said lower surface of the drawbar.

* * * * *